US011873183B2

(12) United States Patent
Ito et al.

(10) Patent No.: US 11,873,183 B2
(45) Date of Patent: Jan. 16, 2024

(54) MEDIUM PLACEMENT DEVICE AND RECORDING SYSTEM

(71) Applicant: Seiko Epson Corporation, Tokyo (JP)

(72) Inventors: Shun Ito, Matsumoto (JP); Masaki Namiki, Kitakyushu (JP); Haruna Takahashi, Ina (JP); Mio Yashita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 17/505,140

(22) Filed: Oct. 19, 2021

(65) Prior Publication Data

US 2022/0127098 A1 Apr. 28, 2022

(30) Foreign Application Priority Data

Oct. 22, 2020 (JP) ................................ 2020-177402

(51) Int. Cl.

| | |
|---|---|
| ***B65H 31/24*** | (2006.01) |
| ***B41J 15/20*** | (2006.01) |
| ***B65H 29/40*** | (2006.01) |
| ***B65H 31/26*** | (2006.01) |
| ***B65H 35/00*** | (2006.01) |

(52) U.S. Cl.

CPC ............. *B65H 31/24* (2013.01); *B41J 15/20* (2013.01); *B65H 29/40* (2013.01); *B65H 31/26* (2013.01); *B65H 35/0006* (2013.01); *B65H 2401/22* (2013.01); *B65H 2403/51* (2013.01); *B65H 2404/721* (2013.01); *B65H 2405/1117* (2013.01); *B65H 2405/332* (2013.01)

(58) Field of Classification Search

CPC ........ B65H 29/58; B65H 29/60; B65H 31/00; B65H 31/04; B65H 31/24; B65H 31/26; B65H 35/0006; B65H 2401/22; B65H 2403/51; B65H 2403/512; B65H 2403/514; B65H 2405/1117; B65H 2405/332; B65H 2405/353; B65H 2405/354; B65H 2405/36

See application file for complete search history.

(56) References Cited

U.S. PATENT DOCUMENTS

| | | | | |
|---|---|---|---|---|
| 4,420,149 A * | 12/1983 | Schultes | B65H 3/5261 | 221/209 |
| 2006/0017217 A1 * | 1/2006 | Maeda | B41J 29/13 | 347/108 |
| 2006/0071413 A1 * | 4/2006 | Kaneko | B65H 31/24 | 271/220 |
| 2006/0202412 A1 * | 9/2006 | Matsue | B65H 31/18 | 271/213 |
| 2009/0057987 A1 * | 3/2009 | Matsumoto | B65H 3/0607 | 271/114 |

(Continued)

FOREIGN PATENT DOCUMENTS

| | | | |
|---|---|---|---|
| JP | 09278260 A * | 10/1997 | B65H 29/58 |
| JP | 2002-211821 | 7/2002 | |

*Primary Examiner* — Prasad V Gokhale

(74) *Attorney, Agent, or Firm* — WORKMAN NYDEGGER

(57) ABSTRACT

A medium placement device includes a placement unit configured to have cut single paper thereon, a cover member configured to have single paper supplied to or discharged from an opening portion thereon, and a movement unit configured to move the cover member between a first position and a second position that is lower than the first position.

8 Claims, 7 Drawing Sheets

(56) References Cited

U.S. PATENT DOCUMENTS

| | | | | |
|---|---|---|---|---|
| 2012/0056365 | A1* | 3/2012 | Kato | B41J 11/006<br>271/9.1 |
| 2014/0312559 | A1* | 10/2014 | Kidoh | B65H 31/10<br>271/213 |

* cited by examiner

MEDIUM PLACEMENT DEVICE AND RECORDING SYSTEM

The present application is based on, and claims priority from JP Application Serial Number 2020-177402, filed Oct. 22, 2020, the disclosure of which is hereby incorporated by reference herein in its entirety.

BACKGROUND

1. Technical Field

The present disclosure relates to a medium placement device and a recording system.

2. Related Art

Typically, as shown in JP-A-2002-211821, it is known that a long medium discharged from a recording device is received by a flexible receiving device such as a cloth.

Some recording devices that record on the long medium can record on a single paper medium by supplying the single paper medium from the receiving device side. However, the receiving device described in JP-A-2002-211821 does not include a member that supports the single paper medium, so it is difficult to supply the single paper medium correctly.

SUMMARY

A medium placement device configured to have, thereon, a first medium discharged from an opening portion of a processing device, a second medium discharged from the opening portion of the processing device, and the second medium supplied to the opening portion of the processing device, the medium placement device including a placement unit configured to have the first medium thereon at a position lower than the opening portion of the processing device, a cover member configured to cover the placement unit and have the second medium thereon, a movement unit configured to move the cover member between a first position and a second position that is lower than the first position, wherein the cover member is configured such that when the cover member is moved to the first position by the movement unit, a first surface of the cover member which is a surface opposing to the placement unit is at a position higher than the opening portion of the processing device, and the first medium discharged from the opening portion of the processing device is guided by the first surface to be placed on the placement unit, and when the cover member is moved to the second position by the movement unit, a second surface that is opposite to the first surface is at the same position as or at a position lower than the opening portion of the processing device, and the second medium discharged from the opening portion of the processing device and the second medium supplied to the opening portion of the processing device are placed on the second surface.

A recording system including a recording device and a medium placement device, wherein the recording device includes a storage unit configured to store a first medium, a transport unit configured to transport the first medium from the storage unit, a recording unit configured to perform recording on the first medium transported by the transport unit, a cutting unit configured to cut the first medium on which recording was performed, and an opening portion configured to discharge the first medium cut by the cutting unit, and the transport unit is configured to transport a second medium supplied from the opening portion to the recording unit, and to transport the second medium on which recording was performed by the recording unit and discharge the second medium from the opening portion, and the medium placement device includes a placement unit configured to have the first medium thereon at a position lower than the opening portion of the recording device, a cover member configured to cover the placement unit and have the second medium thereon, and a movement unit configured to move the cover member between a first position and a second position that is lower than the first position, and the cover member is configured such that when the cover member is moved to the first position by the movement unit, a first surface of the cover member which is a surface opposing to the placement unit is at a position higher than the opening portion of the recording device, and the first medium discharged from the opening portion of the recording device is guided by the first surface to be placed on the placement unit, and when the cover member is moved to the second position by the movement unit, a second surface that is opposite to the first surface is at the same position as or at a position lower than the opening portion of the recording device, and the second medium discharged from the opening portion of the recording device or the second medium supplied to the opening portion of the recording device is configured to be placed on the second surface.

DESCRIPTION OF EXEMPLARY EMBODIMENTS

Figure 1:
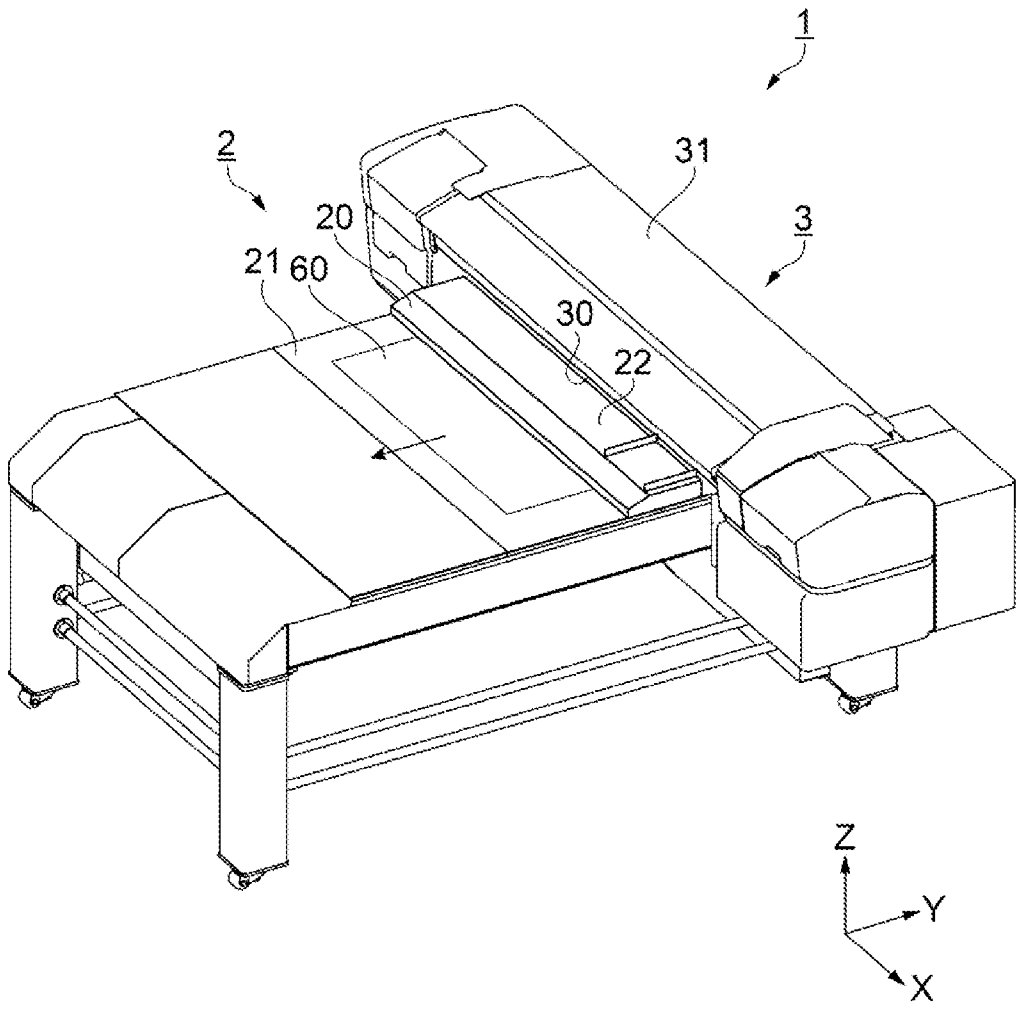
FIG. 1 is a perspective view of a recording system according to a first exemplary embodiment when a first medium is placed thereon.

1. First Exemplary Embodiment 1-1. Configuration of Recording System

A configuration of a recording system according to a first exemplary embodiment will be described below with reference to the accompanying figures.

The directions in the drawings will be described using three-dimensional coordinates. For convenience of description, a positive direction of a Z-axis is referred to as an upward direction or simply upward, a negative direction thereof is referred to as a downward direction or simply downward, a positive direction of an X-axis is referred to as a right direction or simply right, and a negative direction thereof is referred to as a left direction or simply left, and a positive direction of a Y-axis is referred to as a rear direction or simply rear, and a negative direction thereof is referred to as a front direction or simply a front, to describe.

As illustrated in FIG. 1, a recording system 1 according to the first exemplary embodiment includes a recording device 3, which is a processing device, and a medium placement device 2 installed in front of the recording device 3.

The recording device 3 is a so-called large-sized printer. A first medium is a long medium 63, which is a long medium illustrated in FIG. 2, and includes the long medium 63 cut by the recording device 3. The long medium 63 cut by the recording device 3 is hereinafter referred to as cut single paper 60 in particular. The cut single paper 60 is a medium having a relatively large size such as AO size or BO size of JIS standard. The medium placement device 2 is installed on a side where the cut single paper 60 is discharged from the recording device 3.

An opening portion 30 is formed at a case 31 of the recording device 3. The cut single paper 60 discharged from the opening portion 30 formed at the case 31 of the recording device 3 is placed on a placement unit 21 of the medium placement device 2. A cover member 20 covers the placement unit 21. The placement unit 21 has an area sufficient to place the cut single paper 60 that has large size such as AO size or BO size.

Figure 4:
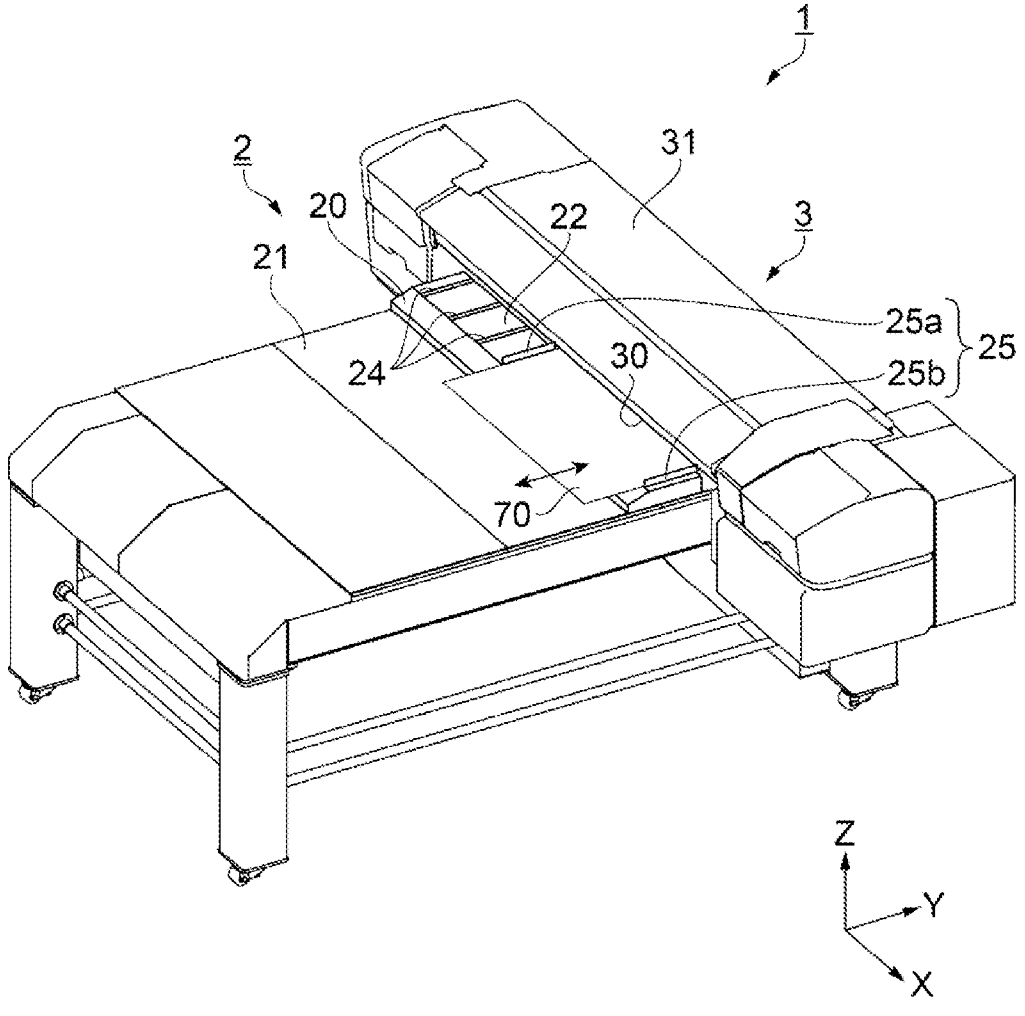
FIG. 4 is a perspective view of the recording system according to the first exemplary embodiment when a second medium is placed thereon.

Further, a second surface 22 which is the upper surface of the cover member 20 of the medium placement device 2, is configured to have, thereon, a single sheet 70 illustrated in FIG. 4 which is a second medium supplied to or discharged from the opening portion 30 of the recording device 3.

1-2. Processing of the First Medium by the Recording System

First, the recording device 3 illustrated in FIG. 2 will be described. The recording device 3 is configured to store roll papers A and B in which the long medium 63 is wound in a roll form in storage units 61 and 62 at the lower part of the case 31. The roll papers A and B may have different paper widths. A first transport unit 35 and a second transport unit 36 pull out the long medium 63 from any one of the roll papers A and B stored in the storage units 61 and 62 via respective paper paths 41 and 42, and transport the long medium 63 along a common paper path 43. Note that the long medium 63 is also referred to as roll paper.

With respect to the position of a head 32, the first transport unit 35 is arranged upstream and the second transport unit 36 is arranged downstream, in a transport direction of the long medium 63. The transport direction of the long medium 63 is the front direction, which is a −Y direction with respect to the head 32, and is a direction indicated by an arrow.

The first transport unit 35 is constituted by a first driving roller 35*a* and a first driven roller 35*b*. The long medium 63 is sandwiched between the first driving roller 35*a* and the first driven roller 35*b*, and the long medium 63 is transported by the drive of the first driving roller 35*a*. The second transport unit 36 is constituted by a second driving roller 36*a* and a second driven roller 36*b*. The long medium 63 is sandwiched between the second driving roller 36*a* and the second driven roller 36*b*, and the long medium 63 is transported by the drive of the second driving roller 36*a*.

The long medium 63 is transported to a position between the head 32 and a platen 33 opposing to the head 32 by the first transport unit 35 and the second transport unit 36, and is recorded by the head 32. The head 32 is, for example, an ink jet-type head. The head 32 is arranged upward which is a +Z direction side, and the platen 33 is arranged downward which is a −Z direction side, and the long medium 63 is transported along the platen 33. The platen 33 defines a distance between the head 32 and the long medium 63. Ink is discharged from the head 32 in the downward direction which is the −Z direction, and is attached to the long medium 63 and recorded thereon. The platen 33 may be provided with a suction mechanism that sucks air, and the long medium 63 may be attracted to the platen 33 to more strictly define the distance between the head 32 and the long medium 63.

The long medium 63 recorded by the head 32 is transported to the position of a cutter 34 by the first transport unit 35 and the second transport unit 36, and is cut by the cutter 34. The cutter 34 is constituted by a movable blade and a fixed blade. The cutter 34 cuts the long medium 63 between the fixed blade and the movable blade by moving the movable blade with respect to the fixed blade.

As described above, the long medium 63 that has been cut is referred to as the cut single paper 60. The cut single paper 60 separated from the long medium 63 is sandwiched only by the second transport unit 36. The cut single paper 60 is transported by the second transport unit 36 and guided by a paper guide 44, and discharged from the opening portion 30. A sensor 37 is arranged between the second transport unit 36 and the opening portion 30. When the cut single paper 60 is transported by the second transport unit 36 and the sensor 37 detects the rear end of the cut single paper 60, the second transport unit 36 stops the transport. The sensor 37 is, for example, a photosensor.

Next, the medium placement device 2 illustrated in FIG. 2 will be described. The placement unit 21 of the medium placement device 2 is located lower than the opening portion 30 of the recording device 3, and is at a position having a height at which a plurality of the cut single papers 60 discharged from the opening portion 30 of the recording device 3 can be placed.

The cover member 20 has a first surface 23 which is a surface opposing to the placement unit 21, and the first surface 23 is configured to guide the cut single paper 60 discharged from the opening portion 30 to have the cut single paper 60 on the placement unit 21.

The cover member 20 is formed of a transmissive material. The cover member 20 covers the placement unit 21, but is constituted by the transmissive material. Therefore, the user can visually recognize the state of the cut single paper 60 placed on the placement unit 21 through the cover member 20.

Figure 3:
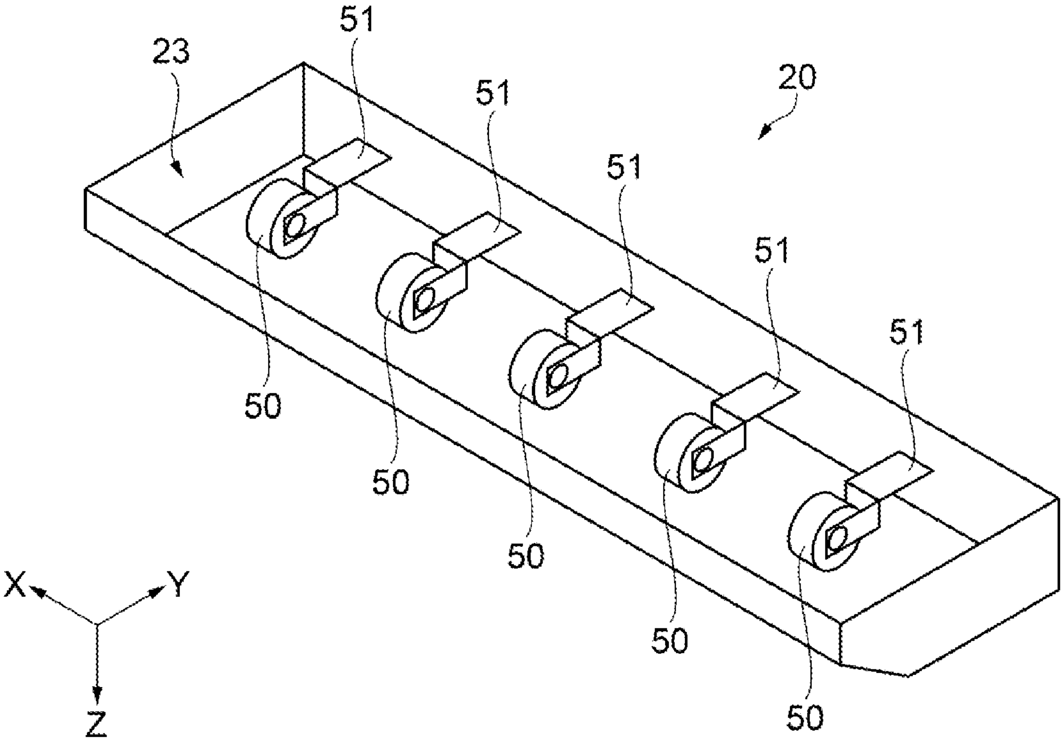
FIG. 3 is a perspective view of a cover member according to the first exemplary embodiment as viewed from below.

As illustrated in FIG. 3, the first surface 23 of the cover member 20 may be provided with a plurality of pressing members 50 in the width direction. Furthermore, the plurality of pressing members 50 may also be provided in the transport direction. The plurality of pressing members 50 are each supported by a plurality of pressing member support units 51.

The pressing member 50 is formed of an elastic material such as rubber and has a rotatable roller shape. The pressing member support unit 51 is formed of a flexible material such as resin, and is configured to press the pressing member 50 and rotatably supports the pressing member 50.

Due to the flexibility of the pressing member support unit 51, the pressing member 50 guides the cut single paper 60 discharged from the opening portion 30 so as to be pressed and places the cut single paper 60 on the placement unit 21.

Figure 2:
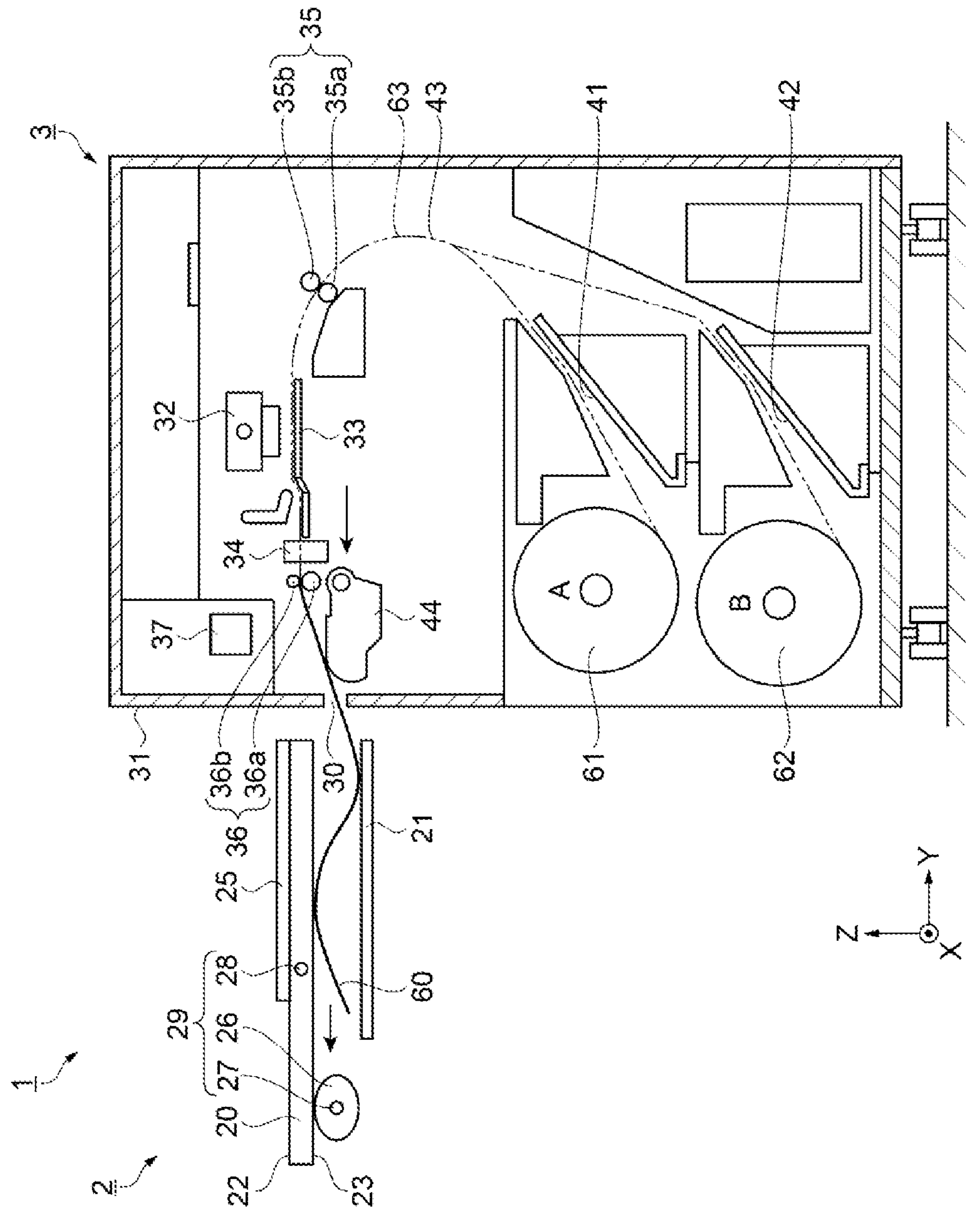
FIG. 2 is a cross-sectional view of the recording system according to the first exemplary embodiment when the first medium is placed thereon.

As illustrated in FIG. 2, since the roll papers A and B stored in the recording device 3 are wound in a roll form, they have a winding habit called a curl. Both the long medium 63 drawn from the paper rolls A and B and the cut single paper 60 discharged from the opening portion 30 of the recording device 3 are curled.

The pressing member 50 of the cover member 20 can press the curled portion of the curled cut single paper 60 that is between the cover member 20 and the pressing member 50 from above toward the placement unit 21, and thus the curl of the cut single paper 60 can be corrected.

In FIG. 2, an arc shaped portion of the cut single paper 60 placed on the placement unit 21 shows the curl. The pressing member 50 presses the curled portion of the cut single paper 60 from above toward the placement unit 21, and corrects the curl of the cut sheet 60 from the arc shape to a straight shape.

1-3. Processing of the Second Medium by the Recording System

First, the medium placement device 2 illustrated in FIG. 4 will be described. The second surface 22 which is the upper surface of the cover member 20 of the medium placement device 2 and is a surface opposite to the first surface 23, is configured to have, thereon, the single paper 70 which is the second medium supplied to or discharged from the opening portion 30 of the recording device 3. The single paper 70 has a size such as A2 size or B3 of JIS standard, and is a medium such as a thick paper having a high rigidity that cannot be transported on the curved common paper path 43.

The second surface 22 of the cover member 20 may have a regulating member 25 that regulates the single paper 70 in the paper width direction, which is the left-right direction. Specifically, as illustrated in FIG. 5, the regulating member 25 is constituted by a second regulating member 25*b* that is fixed and that regulates a reference position of the paper width, and a first regulating member 25*a* movable in the paper width direction in accordance with the paper width of the single paper 70.

It becomes easy for the user to supply the single paper 70 straight and correctly to the opening portion 30 of the recording device 3 while regulating the single paper 70 placed on the second surface 22 of the cover member 20 in the paper width direction by the regulating member 25.

Further, the single paper 70 discharged from the opening portion 30 of the recording device 3 can be placed straight on the second surface 22 of the cover member 20 while being regulated in the paper width direction by the regulating member 25.

Figure 5:
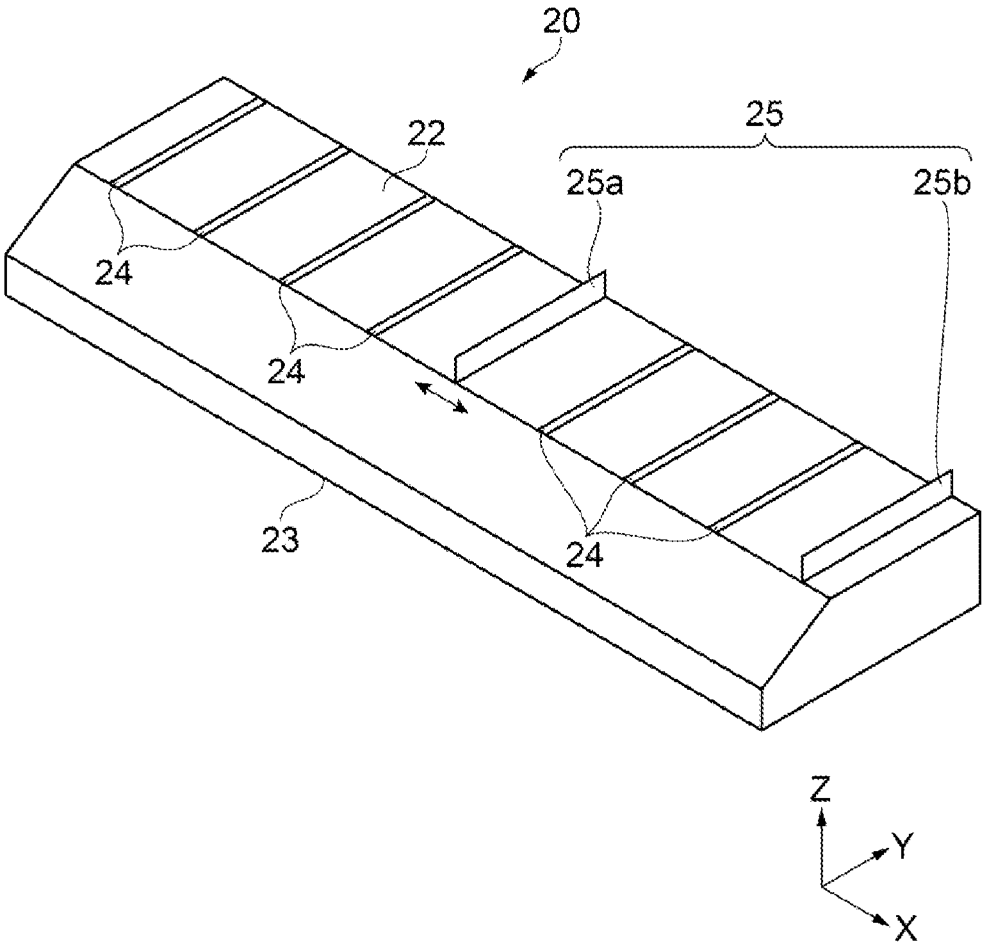
FIG. 5 is a perspective view of the cover member according to the first exemplary embodiment as viewed from above.

As illustrated in FIG. 5, at a portion of the second surface 22 of the cover member 20 on which the single paper 70 is placed, a plurality of ribs 24 extending in a direction intersecting the paper width direction and arrayed in the paper width direction are arranged.

By the ribs 24, the single paper 70 can be smoothly supplied from the second surface 22 to the opening portion 30 of the recording device 3, and can be smoothly discharged from the opening portion 30 to the second surface 22.

Next, the recording device 3 illustrated in FIG. 4 will be described also with reference to FIG. 6. When the user inserts and supplies the single paper 70 from the second surface 22 of the cover member 20 of the medium placement device 2 into the opening portion 30 of the recording device 3, the single paper 70 is guided by the paper guide 44 to reach the second transport unit 36. When the single paper 70 reaches the second transport unit 36, the sensor 37 detects a tip of the single paper 70, and the second transport unit 36 starts the transport in a supply direction, which is the +Y direction. Note that instead of the sensor 37, the second transport unit 36 may be configured to start the transport by the user pressing a switch of the recording device 3.

The single paper 70 is drawn from the opening portion 30 by starting the transport by the second transport unit 36. The single paper 70 is transported rearward of the position of the head 32, which is in the +Y direction, by the second transport unit 36, and then is recorded by the head 32 while being transported in the front direction, which is in the −Y direction.

When recording by the head 32 ends, the single paper 70 is transported in a discharge direction, which is the −Y direction, by the second transport unit 36, guided by the paper guide 44, and discharged from the opening portion 30. When the single paper 70 is no longer detected by the sensor 37 and the single paper 70 is discharged, the second transport unit 36 stops the transport.

Since the single paper 70 is supplied straight and correctly by the medium placement device 2, it is possible to avoid skewing or paper jam due to the transport of the second transport unit 36.

In a case in which the long medium 63 is located at the position of the head 32 when the sensor 37 detects the tip of the single paper 70, the long medium 63 is transported upstream in the transport direction by the first transport unit 35, and is retracted to a position where the long medium 63 does not hinder the transport of the single paper 70 to the position of the head by the second transport unit 36 and the recording thereon.

1-4. Movement Unit of the Medium Placement Device

An example of a movement unit of the medium placement device according to the first exemplary embodiment will be described with reference to FIGS. 2 and 6. A movement unit 29 of the medium placement device 2 includes a support unit 28 configured to rotatably support the cover member 20, a cam 26 that is a rotation unit configured to rotate the cover member 20 about the support unit 28, and a rotary shaft 27 configured to rotate the cam 26. The cam 26 is installed in front of the support unit 28, which is in the −Y direction, and is installed on the opposite side from the opening portion 30. The cam 26 has an elliptical cross section and contacts the cover member 20.

When rotating the cover member 20, the medium placement device 2 rotates the cam 26 by rotating the rotary shaft 27 by a lever or motor (not illustrated). As the cam 26 rotates, the cover member 20 that contacts the cam 26 rotates about the support unit 28. By the rotation operation of the cam 26, both ends of the cover member 20 in the discharge direction, that is in the Y-axis direction, rotate about the support unit 28 like a seesaw.

Figure 6:
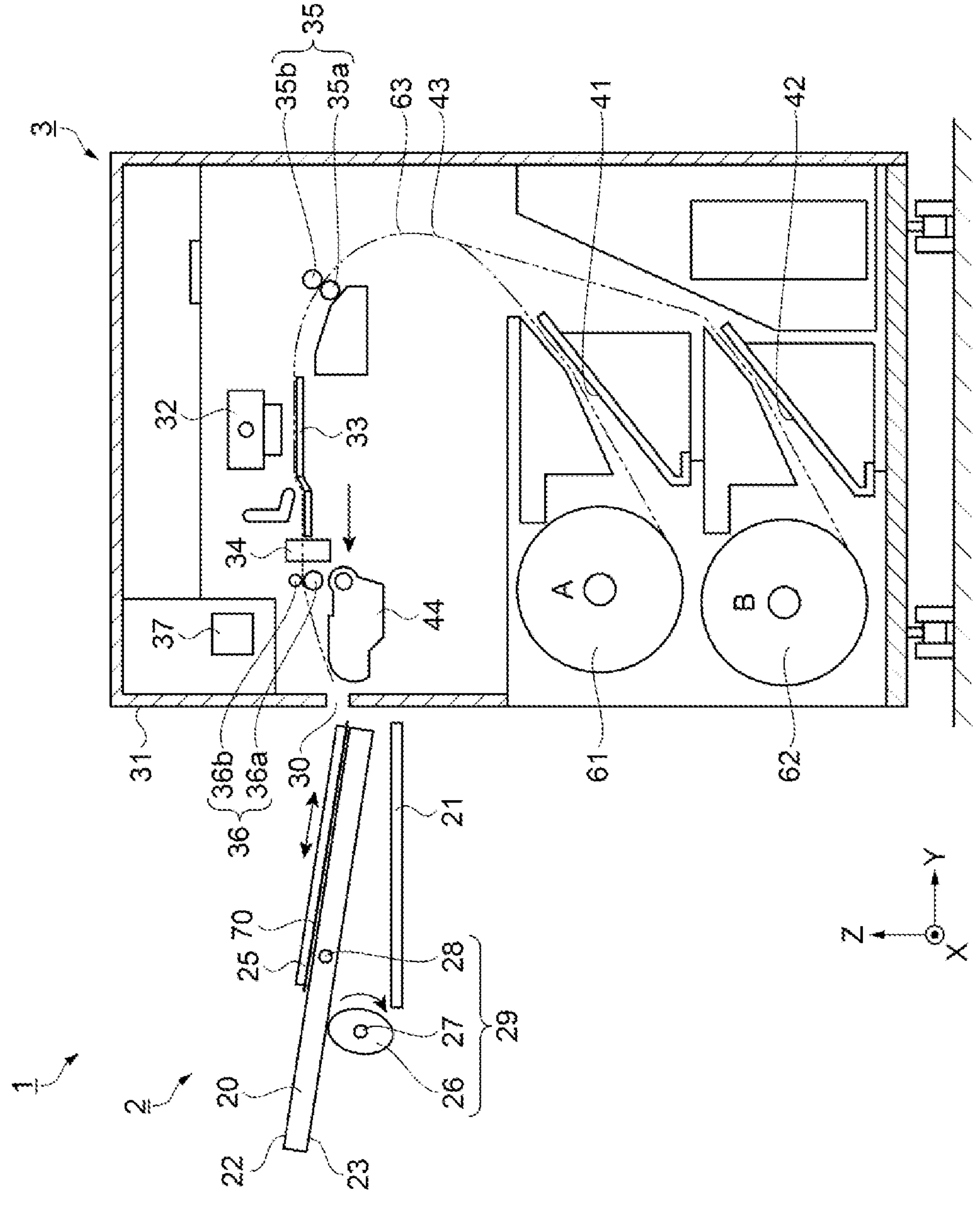
FIG. 6 is a cross-sectional view of the recording system according to the first exemplary embodiment when the second medium is placed thereon.

FIG. 2 illustrates a case in which the cover member 20 is at a first position, and FIG. 6 illustrates a case in which the cover member 20 is at a second position. By the rotation operation of the cam 26, the cover member 20 moves between the first position and the second position by rotating.

As in the medium placement device 2 illustrated in FIG. 2, when the cover member 20 moves from the second position to the first position by the rotation operation by the cam 26, at least an end of the first surface 23, which is the lower surface of the cover member 20, facing the opening portion 30 of the recording device 3, is at a position higher than the opening portion 30 of the recording device 3.

When the cover member 20 is at the first position, the cut single paper 60 discharged from the opening portion 30 of the recording device 3 can pass between the first surface 23 of the cover member 20 and the placement unit 21. At this time, the cut single paper 60 is guided by the first surface 23 of the cover member 20 and can be placed on the placement unit 21.

As described above, at this time, the pressing member 50 of the cover member 20 can press the curled portion of the curled cut sheet 60 that is located between the cover member 20 and the placement unit 21 from above toward the placement unit 21, and therefore the curls of the cut single paper 60 can be corrected.

As in the medium placement device 2 illustrated in FIG. 6, by the rotation operation by the cam 26, the cover member 20 is moved from the first position to the second position. The end of the cover member 20 facing the opening portion 30 of the recording device 3 is lower at the second position than that at the first position.

At the second position, at least the end of the second surface 22, which is the upper surface of the cover member 20, facing the opening portion 30 of the recording device 3 is at a position having the same height as or at a position lower than the opening portion 30 of the recording device 3.

As a result, it becomes easy for the user to insert the single paper 70 placed on the second surface 22 of the cover member 20 to the opening portion 30 of the recording device 3 and to correctly supply the single paper 70.

Further, the single paper 70 discharged from the opening portion 30 of the recording device 3 can be placed on the second surface 22 of the cover member 20.

When at least the end of the second surface 22 of the cover member 20 which faces the opening portion 30 of the recording device 3 is lower than the opening portion 30 of the recording device 3, the position of the rib 24 of the second surface 22 of the cover member 20 on which the single paper 70 is placed may be at the same height as the opening portion 30 of the recording device 3.

The single paper 70 can be smoothly supplied to the opening portion 30 of the recording device 3 while contacting the rib 24, and can be smoothly discharged from the opening 30 while contacting the rib 24.

2. Second Exemplary Embodiment

Figure 7:
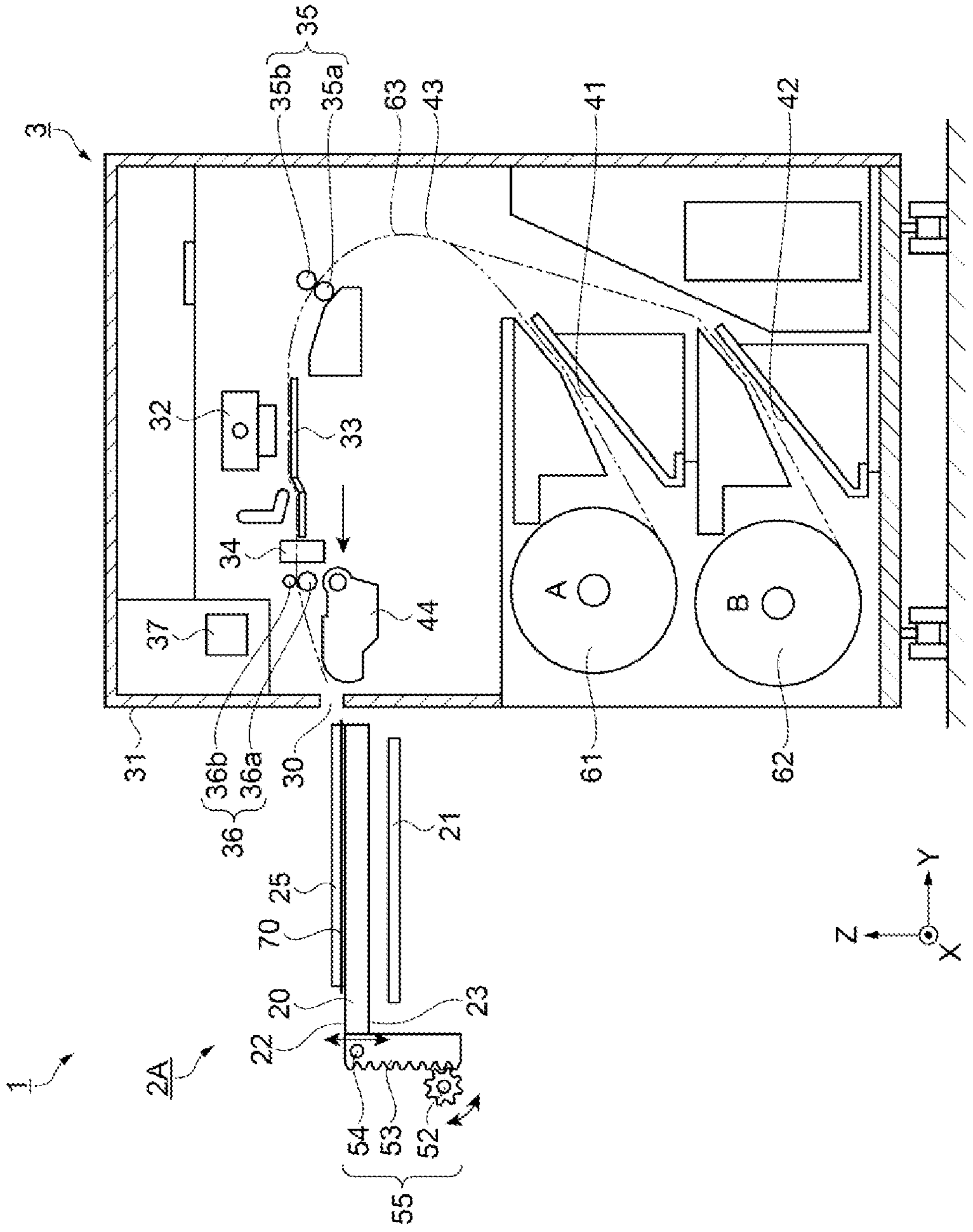
FIG. 7 is a cross-sectional view of the recording system according to a second exemplary embodiment when the second medium is placed thereon.

A second exemplary embodiment illustrated in FIG. 7 is different from the movement unit 29 according to the first exemplary embodiment, and includes an elevating unit 55 configured to move the entire cover member 20 upward and downward. In FIG. 7, the same reference numerals are used for the components common to those in the first exemplary embodiment illustrated in FIGS. 2 and 6.

As illustrated in FIG. 7, the elevating unit 55 of a medium placement device 2A includes a rack 53 and a pinion 52 constituting a rack and pinion, and a fixing unit 54 that fixes the rack 53 and the cover member 20.

The medium placement device 2A rotates the pinion 52 by a dial or a motor (not illustrated). A toothed gear of the pinion 52 and linearly aligned teeth of the rack 53 mesh with each other, and the rotation of the pinion 52 raises and lowers the rack 53. Since the rack 53 is fixed to the cover member 20 by the fixing unit 54, the entire cover member 20 also moves up and down between the first position and the second position as the rack 53 moves up and down. The height of the cover member 20 is lower when the cover member 20 is at the second position than when that is at the first position.

FIG. 7 illustrates when the cover member 20 has moved from the first position to the second position by the elevating unit 55. The entire second surface 22 of the cover member 20 becomes at the same position as or at a position lower than the opening portion 30 of the recording device 3.

As a result, it becomes easy for the user to insert the single paper 70 placed on the second surface 22 of the cover member 20 to the opening portion 30 of the recording device 3 and to correctly supply the single paper 70.

Further, the single paper 70 discharged from the opening portion 30 of the recording device 3 can be placed on the second surface 22 of the cover member 20.

When the second surface 22 of the cover member 20 is lower than the opening portion 30 of the recording device 3, the position of the rib 24 of the second surface 22 of the cover member 20 on which the single paper 70 is placed may be at the same height as the opening portion 30 of the recording device 3.

The single paper 70 can be smoothly supplied to the opening portion 30 of the recording device 3 while contacting the rib 24, and can be smoothly discharged from the opening 30 while contacting the rib 24.

When the cover member 20 is moved from the second position to the first position by the elevating unit 55, the positions of the cover member 20 and the placement unit 21 are the same as those in FIG. 2, and therefore will be described with reference to FIG. 2.

When the cover member 20 is moved from the second position to the first position by elevating operation by the elevating unit 55, the cover member 20 is located such that the entire first surface 23 which is the lower surface of the cover member 20 is at a position higher than the opening portion 30 of the recording device 3, in the same manner as illustrated in FIG. 2.

When the cover member 20 is at the first position, the cut single paper 60 discharged from the opening portion 30 of the recording device 3 can pass between the first surface 23 of the cover member 20 and the placement unit 21. At this time, the cut single paper 60 is guided by the first surface 23 of the cover member 20 and can be placed on the placement unit 21.

As described above, at this time, the pressing member 50 of the cover member 20 can press the curled portion of the cut single paper 60 that is between the placement unit 21 and the pressing member 50 from above toward the placement unit 21, and therefore the curl of the cut single paper 60 can be corrected.

According to the exemplary embodiments described above, the following advantages are obtained.

An embodiment of the medium placement device 2 configured to have, thereon, the cut single paper 60 that is the first medium discharged from the opening portion 30 of the recording device 3 that is a processing device, the single paper 70 that is the second medium discharged from the opening portion 30 of the recording device 3, and the single paper 70 supplied to the opening portion 30 of the recording device 3, includes the placement unit 21 configured to have the cut single paper 60 thereon at a position lower than the opening portion 30 of the recording device 3, the cover member 20 configured to cover the placement unit 21 and have the single paper 70 thereon, the movement unit 29 configured to move the cover member 20 between the first position and the second position that is lower than the first position, wherein the cover member 20 is configured such that when the cover member 20 is moved to the first position by the movement unit 29, the first surface 23 of the cover member 20 which is the surface opposing to the placement unit 21 is at the position higher than the opening portion 30 of the recording device 3, and the cut single paper 60 discharged from the opening portion 30 of the recording device 3 is guided by the first surface 23 and placed on the placement unit 21, and when the cover member 20 is moved to the second position by the movement unit 29, the second surface 22 that is opposite to the first surface 23 is at the same position as or at a position lower than the opening portion 30 of the recording device 3, and the single paper 70 discharged from the opening portion 30 of the recording device 3 and the single paper 70 supplied to the opening portion 30 of the recording device 3 are placed on the second surface 22.

According to the above-described aspect, by moving the position of the cover member 29 with respect to the opening portion 30 of the recording device 3 between the first position and the second position, the medium placement device 2 can have the cut single paper 60 discharged from the opening portion 30 of the recording device 3 on the placement unit 21, or can have the single paper 70 discharged from the opening portion 30 of the recording device 3 on the placement unit 21, and can have the single paper 70 supplied by the user to the opening portion 30 of the recording device 3 on the second surface 22 of the cover member 20, and therefore the second medium can be inserted straight and correctly into the opening portion 30 of the recording device 3.

In an embodiment of the recording system 1 including the recording device 3 and the medium placement device 2, the recording device 3 includes the storage units 61 and 62 configured to store the first medium that is the long medium 63, the first transport unit 35 and the second transport unit 36 configured to transport the long medium 63 from the storage units 61 and 62, the head 32 that is the recording unit configured to perform recording on the long medium 63 transported by the first transport unit 35 and the second transport unit 36, the cutter 34 that is the cutting unit configured to cut the long medium 63 on which recording was performed, and the opening portion 30 configured to discharge the cut single paper 60 that is the long medium 63 cut by the cutter 34. The second transport unit 36 is configured to transport the single paper 70 supplied from the opening portion 30 to the head 32, and to transport the single paper 70 on which recording was performed by the head 32 and discharge the single paper 70 from the opening portion 30. The medium placement device 2 includes the placement unit 21 configured to have the cut single paper 60 thereon at the position lower than the opening portion 30 of the recording device 3, the cover member 20 configured to cover the placement unit 21 and have the single paper 70 thereon, the movement unit 29 configured to move the cover member 20 between a first position and a second position that is lower than the first position. The cover member 20 is configured such that when the cover member 20 is moved to the first position by the movement unit 29, the first surface 23 of the cover member 20 which is the surface opposing to the placement unit 21 is at the position higher than the opening portion 30 of the recording device 3, and the cut single paper 60 discharged from the opening portion 30 of the recording device 3 is guided by the first surface 23 and placed on the placement unit 21, and when the cover member 20 is moved to the second position by the movement unit 29, the second surface 22 that is opposite to the first surface 23 is at the same position as or at the position lower than the opening portion 30 of the recording device 3, and the single paper 70 discharged from the opening portion 30 of the recording device 3 or the single paper 70 supplied to the opening portion 30 of the recording device 3 is placed on the second surface 22.

According to the above-described aspect, in the recording system 1 including the recording device 3 and the medium placement device 2, by moving the position of the cover member 29 with respect to the opening portion 30 of the recording device 3 between the first position and the second position, the medium placement device 2 can have the cut single paper 60 cut by the cutter 34 and discharged from the opening portion 30 of the recording device 3 on the placement unit 21, or can have the single paper 70 discharged from the opening portion 30 of the recording device 3 on the placement unit 21, and can have the single paper 70 supplied by the user to the opening portion 30 of the recording device 3 on the second surface 22 of the cover member 20, and therefore the second medium can be inserted straight and correctly into the opening portion 30 of the recording device 3.

The embodiments have been described in detail above with reference to the drawings, but the specific configuration is not limited to these embodiments, and changes, substitutions, deletions, and the like may be made without departing from the spirits of the disclosure.

For example, the recording device 3 has been described using the example of a so-called large-sized printer, but is not limited thereto. The cut single paper 60 handled by the recording device 3 may be, for example, a medium having a size smaller than AO size or BO size of JIS standard. Further, the single paper 70 handled by the recording device 3 may be, for example, a medium having a size smaller than A2 size or B3 size of JIS standard. The head 32 of the recording device 3 has been described using the example of an ink jet head, but is not limited thereto. Other heads such as sublimation-type thermal method may be used.

Further, for example, the movement unit 29 that moves the cover member 20 of the medium placement device 2 has been described using the example using the cam 26, and the elevating unit 55 has been described using the example using the rack and pinion configuration, but are not limited thereto, and the cover member 20 may be moved by transmitting a force using a combination of gears, belts, wires, and the like based on an actuator such as a motor.

Further, for example, the movement unit 29 and the elevating unit 55 of the medium placement device 2 have been described using the example in which the cover member 20 is moved, but the placement unit 21 may be moved together with the cover member 20. Further, for example, the pressing member 50 of the medium placement device 2 has been described using the example having a roller shape, but is not limited thereto, and the pressing member 50 may be formed in a plate shape and the cut single paper 60 may be pressed from an oblique angle.

Further, for example, the storage units 61 and 62 of the recording device 3 and the roll papers A and B stored in each of the storage units 61 and 62 may not be two, and may be one or three or more.

Furthermore, for example, the roll papers A and B may not be paper, and may be cloth or film other than paper.

What is claimed is:

1. A medium placement device configured to have, thereon, a first medium to be discharged from an opening portion of a processing device, a second medium to be supplied to the opening portion of the processing device and then discharged from the opening portion of the processing device, the medium placement device comprising:

a placement unit configured to have the first medium thereon at a position lower than the opening portion of the processing device, a cover member configured to cover the placement unit and have the second medium thereon, a mover configured to move the cover member between a first position and a second position that is lower than the first position, wherein the cover member is configured such that when the cover member is moved to the first position by the mover, a first surface of the cover member which is a surface facing the placement unit is at a position higher than the opening portion of the processing device, and the first medium discharged from the opening portion of the processing device is configured to be guided by the first surface to be placed on the placement unit, and when the cover member is moved to the second position by the mover, a second surface that is opposite to the first surface is at the same position as or at a position lower than the opening portion of the processing device, and the second medium placed on the second surface is supplied to the opening portion and then discharged to the placement unit from the opening portion of the processing device.

2. The medium placement device according to claim 1, wherein the movement unit includes a supporter configured to rotatably support the cover member, and a rotator configured to rotate the cover member about the supporter, and when the cover member is moved from the first position to the second position by rotation operation by the rotator, at least an end of the second surface facing the opening portion of the processing device is at the same position as or at a position lower than the opening portion of the processing device.

3. The medium placement device according to claim 1, wherein the mover includes an elevator configured to move the cover member upward and downward, and when the cover member is moved from the first position to the second position by elevating operation by the elevator, the second surface of the cover member is at the same position as or at a position lower than the opening portion of the processing device.

4. The medium placement device according to claim 1, wherein the cover member includes a pressing member at the first surface, and the pressing member is configured to press the first medium placed at the placement unit.

5. The medium placement device according to claim 1, wherein the first medium is cut single paper which is roll paper that was cut, and the second medium is single paper.

6. The medium placement device according to claim 1, wherein the cover member is formed of a transmissive material.

7. The medium placement device according to claim 1, wherein at the second surface of the cover member, a regulating member configured to regulate the second medium in a paper width direction, and a plurality of ribs that extend in a direction intersecting the paper width direction and are arrayed in the paper width direction, are provided, and when the cover member is moved to the second position by the movement unit, a position of the rib when the second medium is placed is at the same position as the opening portion of the processing device.

8. A recording system comprising:

a recording device; and a medium placement device, wherein the recording device includes a storage unit configured to store a first medium, a transport unit configured to transport the first medium from the storage unit, a recording unit configured to perform recording on the first medium transported by the transport unit, a cutting unit configured to cut the first medium on which recording was performed, and an opening portion configured to discharge the first medium cut by the cutting unit, the transport unit is configured to transport a second medium supplied from the opening portion to the recording unit, and to transport the second medium on which recording was performed by the recording unit and discharge the second medium from the opening portion, the medium placement device includes a placement unit configured to have the first medium thereon at a position lower than the opening portion of the recording device, a cover member configured to cover the placement unit and have the second medium thereon, and a mover configured to move the cover member between a first position and a second position that is lower than the first position, and the cover member is configured such that when the cover member is moved to the first position by the mover, a first surface of the cover member which is a surface facing the placement unit is at a position higher than the opening portion of the recording device, and the first medium discharged from the opening portion of the recording device is guided by the first surface to be placed on the placement unit, and when the cover member is moved to the second position by the mover, a second surface that is opposite to the first surface is at the same position as or at a position lower than the opening portion of the recording device, and the second medium placed on the second surface is supplied to the opening portion and then discharged to the placement unit from the opening portion.

* * * * *